W. Heath,

Invalid Bedstead,

No. 2,950, Reissued May 26, 1868.

Witnesses;

J. N. Piper.

F. P. Hale Jr.

Inventor;

Wm. Heath.

by his attorney.

R. U. Eddy

N. PETERS, PHOTO-LITHOGRAPHER, WASHINGTON, D. C.

UNITED STATES PATENT OFFICE.

WILLIAM HEATH, OF BATH, MAINE.

IMPROVED INVALID-BEDSTEAD.

Specification forming part of Letters Patent No. 75,265, dated March 10, 1868; Reissue No. 2,950, dated May 26, 1868.

*To all whom it may concern:*

Be it known that I, WILLIAM HEATH, of Bath, in the county of Sagadahoc, in the State of Maine, have invented a new and useful Improved Invalid-Bedstead; and I do hereby declare the same to be fully described in the following specification and represented in the accompanying drawings, of which—

Figure 1:
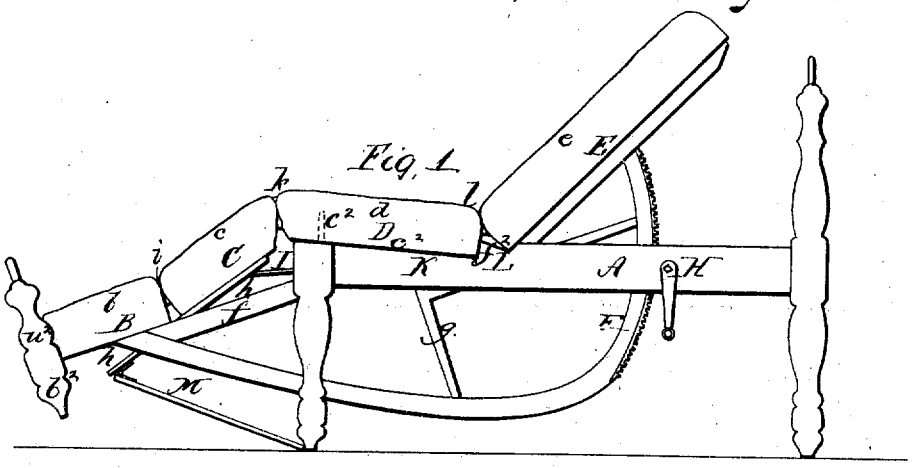
Figure 2:
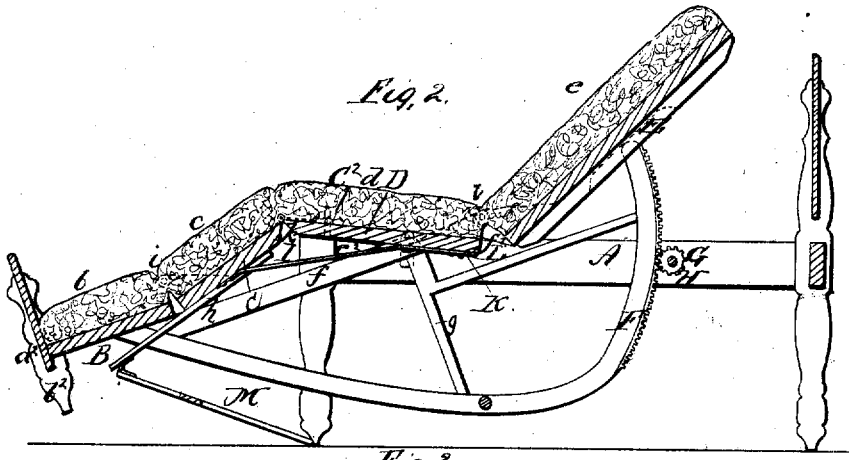
Figure 3:
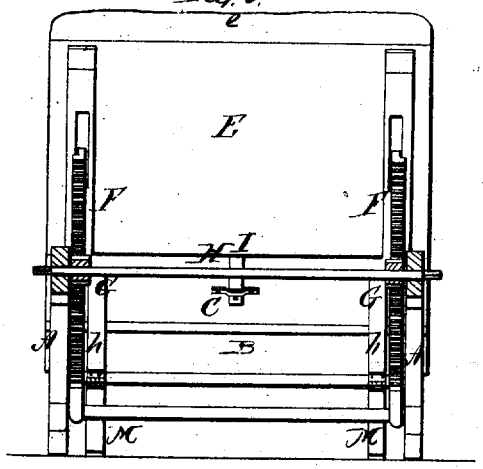

Figure 1 denotes a side elevation, and Fig. 2 a longitudinal section, of it. Fig. 3 is a transverse section taken through the operative shaft and pinions or gears G G.

In the said drawings, A denotes the frame for supporting the operative parts, it being formed as represented, or otherwise suitably made. At or near one end of this frame is what I term the "seat-frame" D, which constitutes part of the bedstead-frame, which is composed of four portions, B, C, D, and E, all of which are to be suitably connected together by hinges *i k l*, upholstered or provided with cushions, as shown at *b c d e*. Within the frame A, and against opposite sides of it, two toothed sectors, F F, are arranged, and are applied to the frame so as to be capable of being moved on centers and in vertical planes, and by means of gears G G, fixed on a horizontal shaft, H, extended across the frame A, and being supported in suitable boxes or bearings applied thereto. From each of the toothed sectors an arm, *f*, supported by a stud, *g*, is extended toward and underneath the parts B C of the bed-frame. The front edge of the said part C rests on the two arms, *f f*. There is also one or more arms, *h h*, which are extended from the under side of the portion C underneath and against the lower side of the part B. An elastic band or spring, I, extends from the part C to or about to the rear part of the portion D, and at its ends is fastened to the bottoms of such parts. When the part E is in the act of being elevated by the toothed sectors, the said band I serves to depress or decline the part C. A foot-frame, $a^2$, having short legs $b^2$ $b^2$, is fastened to the front end of the part B, and serves to support the said part B when in its lowest position.

The seat-frame D is held in position or connection with the frame A by means of short pins $c^2$, projecting from the frame A up into holes made in the seat-frame, near its front edge and ends, the same being large enough to admit of the seat-frame being depressed or dropped backward a little. Hinges may be used in lieu of such pieces. While the back-frame E is in the act of being raised, the seat-frame will be depressed or declined into triangular recesses K K, made in the two side rails of the frame A. The bottoms $e^2$ $e^2$ of these recesses serve to support the seat-frame when depressed on them. In rear of each of the recesses K K is another such recess, L, which is formed on the side rail. The bottom $f^2$ of such recess is an inclined plane, and serves as a cam to enable the back-frame E, while being depressed, to elevate the frame D into a horizontal position or out of the recesses K K.

In order to support the parts B C, when in a horizontal position, I employ the arms *h h*, before mentioned, and also a pair of legs, M M, which I hinge to the arms *h h*, such legs standing vertically on the floor when the parts B C D E are in a horizontal plane. The said legs take an inclined position when the back-frame E is elevated, in which case the legs extend back underneath the parts C and D. By applying a key or crank to the shaft H, and revolving it, we can put the toothed sectors in movement so as to throw the back-rest E up into an inclined positon, and the leg-rests B C down into inclined positions. The seat-frame D will also be depressed at its rear edge, or will fall into the recesses K K, the same being as exhibited in the drawings.

The above-described invalid-bedstead, with the exception of the recesses K L and the legs M M, is essentially like what is represented and described in Letters Patent No. 59,600, granted to me on the 13th day of November, A. D. 1866.

The additional recesses K L are for effecting important results, as set forth—viz., the depression and elevation of the seat-frame D. The weight of a patient, while on the bed and the back-frame is being raised, will cause the seat-frame to fall down into the recesses K L, the rearward movement of the back-frame on the inclined bottoms $f^2$ $f^2$ of the recesses L L serving to greatly ease the seat-frame back or down into the recesses K K. While the back-frame is being depressed, its leverage on the bottoms of the recesses L L will effect the elevation of the seat-frame to a horizontal position.

What, therefore, I claim as my present invention is as follows:

1. The combination of the recesses K K L L, or their equivalents, with the frame A, the two frames D E, and mechanism for moving and depressing or operating the back-frame E, substantially in manner as described.

2. The combination of the folding legs M M, with the arms *h h* or their equivalent, the toothed sectors, their arms *f f*, the frame A, and the parts B C D E, arranged and connected substantially as described.

W. HEATH.

Witnesses:
R. H. EDDY,
F. P. HALE, Jr.